(12) United States Patent
Baker et al.

(10) Patent No.: US 12,631,312 B2
(45) Date of Patent: *May 19, 2026

(54) OPTICAL ELEMENT WITH DIFFERENT TRANSMITTANCES FOR A LIGHTING ASSEMBLY

(71) Applicant: EMERGENCY TECHNOLOGY, INC., Hudsonville, MI (US)

(72) Inventors: Douglas V. Baker, Hudsonville, MI (US); Bradley Miller, Hudsonville, MI (US)

(73) Assignee: EMERGENCY TECHNOLOGY, INC., Hudsonville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/821,377

(22) Filed: Aug. 30, 2024

(65) Prior Publication Data

US 2024/0418342 A1 Dec. 19, 2024

Related U.S. Application Data

(63) Continuation of application No. 17/813,682, filed on Jul. 20, 2022, now Pat. No. 12,078,338.

(51) Int. Cl.
| | |
|---|---|
| *F21V 5/00* | (2018.01) |
| *G02B 13/18* | (2006.01) |
| *B60Q 1/52* | (2006.01) |
| *F21Y 115/10* | (2016.01) |

(52) U.S. Cl.
CPC .............. *F21V 5/007* (2013.01); *G02B 13/18* (2013.01); *B60Q 1/52* (2013.01); *F21Y 2115/10* (2016.08)

(58) Field of Classification Search
CPC ............................... F21V 5/007; G02B 13/18
See application file for complete search history.

(56) References Cited

U.S. PATENT DOCUMENTS

| | | | | |
|---|---|---|---|---|
| 12,078,338 | B2 * | 9/2024 | Baker | F21V 5/007 |
| 2012/0001531 | A1 * | 1/2012 | Cho | F21V 29/74 |
| | | | | 313/46 |
| 2013/0285081 | A1 * | 10/2013 | Kuhn | H10H 20/856 |
| | | | | 257/88 |
| 2014/0211467 | A1 * | 7/2014 | Yang | F21K 9/60 |
| | | | | 362/235 |
| 2015/0330592 | A1 * | 11/2015 | Olson | F21S 43/40 |
| | | | | 362/520 |
| 2016/0109713 | A1 * | 4/2016 | Osterhout | G02B 27/0172 |
| | | | | 359/630 |
| 2016/0225257 | A1 * | 8/2016 | Millan | G08G 1/096 |
| 2017/0108196 | A1 * | 4/2017 | Nakano | G02B 3/00 |
| 2018/0356563 | A1 * | 12/2018 | Singh | C23C 14/542 |
| 2019/0383601 | A1 * | 12/2019 | Kwon | G01B 11/22 |
| 2020/0088384 | A1 * | 3/2020 | Chiu | F21V 11/16 |
| 2023/0036850 | A1 * | 2/2023 | Olsen | F21S 43/15 |

\* cited by examiner

*Primary Examiner* — Tracie Y Green
*Assistant Examiner* — Michael Chiang
(74) *Attorney, Agent, or Firm* — McGarry Bair PC

(57) ABSTRACT

An optical element or a lighting element assembly including an optical element, can include a first portion of transmittance defining high transmittance enabling greater that 80% of light transmission, and a second portion of transmittance defining a low transmittance enabling less than 40% of light transmission, wherein the second portion of transmittance encircles the first portion of transmittance.

18 Claims, 7 Drawing Sheets

OPTICAL ELEMENT WITH DIFFERENT TRANSMITTANCES FOR A LIGHTING ASSEMBLY

CROSS-REFERENCE TO RELATED APPLICATION

This application is a continuation of U.S. application Ser. No. 17/813,682, filed Jul. 20, 2022, now allowed, which is hereby incorporated herein by reference in its entirety.

BACKGROUND

This invention relates to lighting and illumination fixtures for, in one non-limiting example, a vehicle. In one of its aspects, the disclosure relates to a lighting fixture with multiple light-emitting diode (LED) light sources. In another of its aspects, the disclosure relates to a light assembly of one or more light sources and housing components.

BRIEF SUMMARY

In one aspect, the disclosure relates to an optical element can include a first portion of transmittance defining high transmittance enabling greater that 80% of light transmission, and a second portion of transmittance defining a low transmittance enabling less than 40% of light transmission, wherein the second portion of transmittance encircles the first portion of transmittance.

In another aspect, aspects of the disclosure relate to a lighting element assembly including an illuminator, and an optical element associated with the illuminator and defining a first portion of transmittance defining high transmittance enabling greater that 80% of light transmission from the illuminator, and further defining a second portion of transmittance defining a low transmittance enabling less than 40% of light transmission from the illuminator, wherein the second portion of transmittance encircles the first portion of transmittance.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

Figure 1:
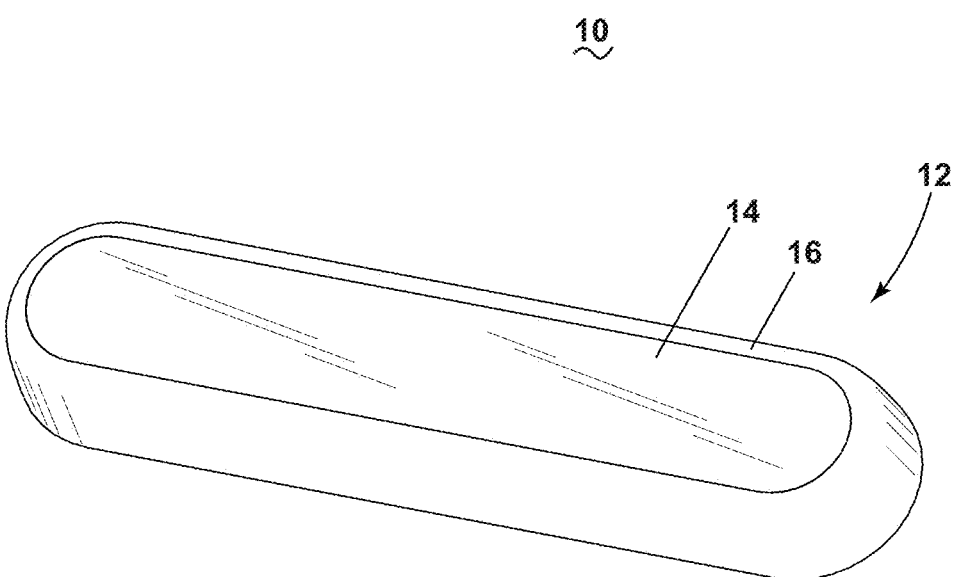
FIG. 1 illustrates a perspective view of a lighting element assembly in accordance with various aspects described herein.

Aspects of the disclosure can be implemented in any environment, apparatus, or method for illuminating or providing illumination. In one non-limiting example configuration, aspects of the disclosure can be included as a portion of a lighting element, a lens, a supplementary lighting element, or an assembly thereof. In one non-limiting example, aspects of the disclosure can be included in a lens, a lighting element or assembly, or an alert assembly, for a vehicle. For example, one non-limiting aspect of the disclosure can be utilized to provide active visual illumination, such as visual or warning, to attract the attention of motorists and pedestrians to the vehicle's presence or approach. While a "vehicle" is described, aspects of the disclosure can be applied to any vehicles, including, but not limited to, emergency vehicles (e.g. fire trucks, ambulances, law enforcement vehicles, or the like), construction vehicles (e.g. cars, trucks, construction equipment, bulldozers, cranes, or the like), land-based vehicles (pedestrian automobiles, motorbikes, all-terrain vehicles, or the like), sea-based vehicles (boats, barges, or the like), or air-based vehicles (aircraft, blimps, balloons, or the like). Non-limiting examples of vehicles can include, for instance, cars, trucks, semi-trucks, off-road vehicles, recreational vehicles, sporting or hunting vehicles or related equipment, cargo carriers, boats, aircraft, and trains. Furthermore, as used herein, a vehicle does not need to include an independent propulsion system, and can include, for example, train cars, barges, trailers, or semi-trailers. In addition to vehicles, non-limiting aspects of the disclosure can also be included in stationary illumination applications, such as signage, security lighting, or the like.

While "a set of" various elements will be described, it will be understood that "a set" can include any number of the respective elements, including only one element. As used herein, the terms "axial" or "axially" refer to a dimension along a longitudinal axis described. The terms "fore" or "forward" refers to a vector in the direction of illumination of a lighting element, while the terms "aft," "backward," or "rear" used in refers to a direction opposite to the vector in the direction of illumination of the lighting element, or toward the rear lighting element.

As used herein, the terms "radial" or "radially" refer to a dimension extending between a center longitudinal axis described, an outer circumference, or a circular or annular component described. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 illustrates a lighting element assembly 10 in accordance with various aspects described herein. Non-limiting aspects of the disclosure can be included wherein the lighting element assembly 10 is a primary lighting element or a supplemental lighting element, for instance, for a vehicle or another device as described above. As used herein, a "primary" lighting element can include a primary illuminator, such as room lighting, or automobile head-lamps, while a "supplementary" lighting element can include non-primary illuminators, including, but not limited to, accessory lighting, light bars (e.g. for emergency or non-emergency vehicles), warning lighting, perimeter lighting, notification lighting, or the like. In additional or alternative aspects of the disclosure, the lighting element assembly 10 can be included as a component or subcomponent of a multiple-element assembly, or the like.

The lighting element assembly 10 can include at least one optical element 12, lighting element lens, or the like, illustrated as a first optical element 14 and a second optical element 16. Non-limiting aspects of the disclosure can be included wherein the first and second optical elements 14, 16 can be formed or molded as a single, continuous optical element 12, or can be separately formed as distinct optical elements 14, 16 and adjoined, assembled, coupled, attached, fixed, or the like. As shown, the at least one optical element 12 can include a top portion (for example, the first optical element 14 portion) having a substantially ovate, planar surface. Also, as shown, at least one optical element 12 can include a side portion (for example, the second optical element 16) having a peripheral wall encircling the top portion while the contours transition from the substantially planar surface of the top portion to a sidewall surface that is substantially perpendicular to the top planar surface. Non-limiting aspects of the disclosure can be included wherein a single-piece optical element, such as that described with respect to the lighting element assembly 10 and optical element 12, can include a dedicated optical emission region or regions, supportive housing regions, environmental sealing features (e.g. weather-proofing or water-proofing), or a combination thereof.

In another non-limiting aspect of the disclosure, at least one of the first or second optical elements 14, 16 can be adjoined, or the like, during the forming process. For example, the first optical element 14 can be formed, molded, manufactured, or the like, and can then be adjoined, or the like, during the forming, molding, manufacturing, or the like, of the second optical element 16. Non-limiting aspects of the disclosure can also be included wherein the compositions, colors, additives, tintings, attenuation, dopings, pigment, dye, or physical properties or characteristics can be the same or dissimilar between the first and second optical elements 14, 16. In yet another non-limiting aspect of the disclosure, at least one of the first or second optical elements 14, 16 can be formed or molded from a flexible, optical-grade silicon material. While a flexible silicon material is described, any silicon or silicone material can be included when describing the flexible silicon material or element, including but not limited to, a silicone polymer material.

Figure 2:
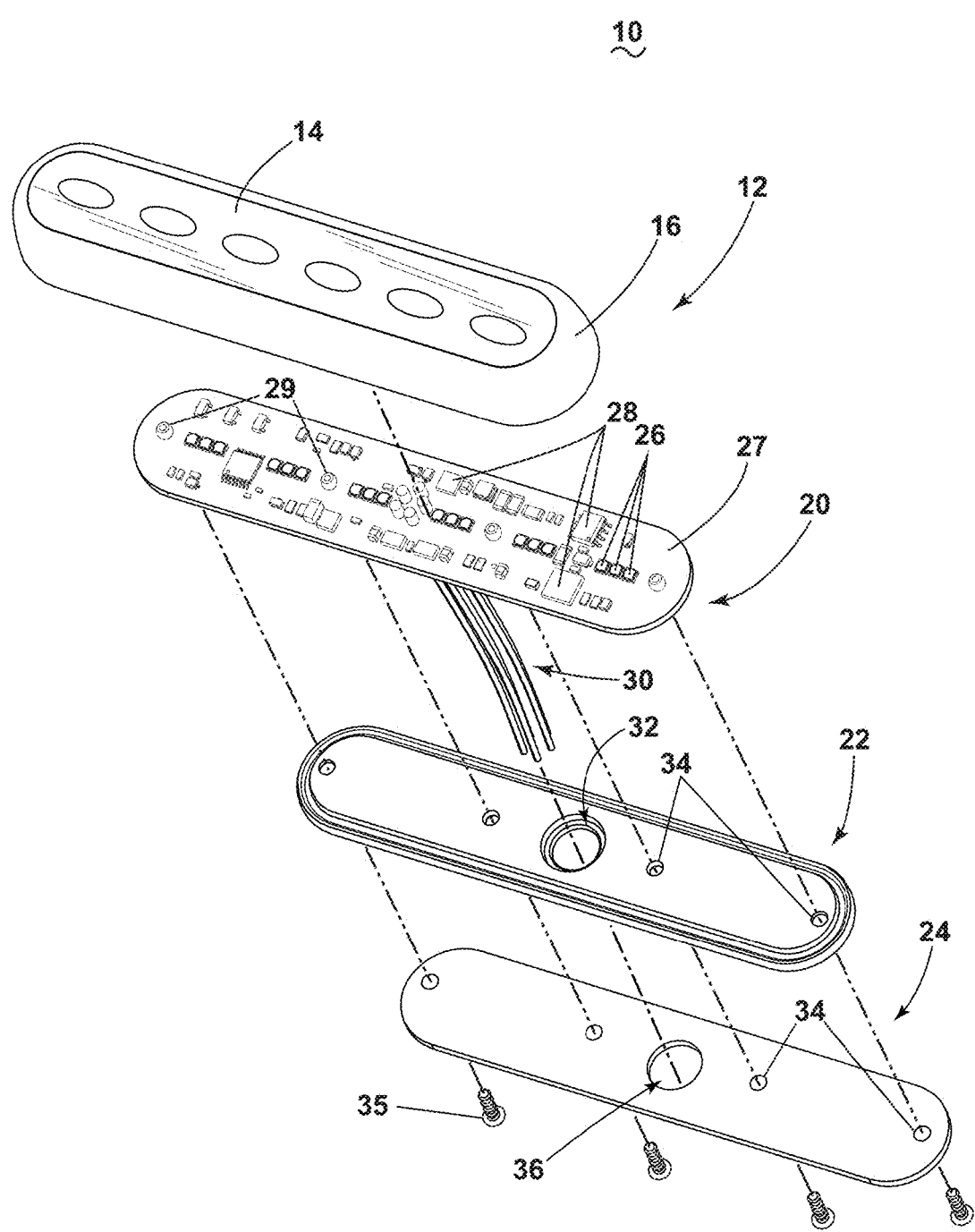
FIG. 2 illustrates an exploded perspective view of the lighting element assembly of FIG. 1, in accordance with various aspects described herein.

FIG. 2 illustrates an exemplary exploded view of one non-limiting lighting element assembly 10. As shown, the lighting element assembly can further include an electronics board portion 20, a thermally conductive heat sink portion 22, and an optional adhesive pad 24. In this sense, the heat sink portion 22 is positioned between the electronics board portion 20 and the optional adhesive pad 24. The electronics board portion 20 can further include, but is not limited to a circuit board 27, such as a printed circuit board (PCB), supporting at least one illuminator and supporting circuitry 28. In the non-limiting illustrated example, at least one illuminator can include a set of light-emitting diodes (LEDs) 26, and the supporting circuitry 28 can include controller modules, drivers or microprocessors configured to operate the set of LEDs 26, memory modules, electrical and signal communication interfaces, power electronics for converting, regulating, or supplying appropriate power levels and patterns to the LEDs 26, and the like. In one non-limiting example, the microprocessors can include control schema to operate the LEDs 26 in at least one configurable operating mode. As shown, non-limiting aspects of the disclosure can be included wherein the entire set of the LEDs 26, or a subset thereof, are positioned or located along a common axis, a common plane, or a common two-dimensional array. Non-limiting aspects of the electronics board portion 20 or the circuit board 27 can be include wherein the electronics board portion 20, the circuit board 27, or a substrate thereof can be rigid or flexible. While the heat sink portion 22 is described as thermally conductive, non-limiting aspects of the disclosure can be included wherein the heat sink portion is thermally dissipative, or a combination of thermally conductive and thermally dissipative.

Non-limiting aspects of the circuit board 27 can also include a set of mountings 29 configured to receive a corresponding or matching set of fasteners. Non-limiting examples of fasteners can include mechanical fasteners, screws, nails, rivets, or the like, to enable or provide for physical attachment or coupling of the electronics board portion 20 or the lighting element assembly 10 to a mounting surface, such as the surface of a vehicle (not shown). In another non-limiting example, the mechanical fasteners can enable or provide for physical attachment or coupling of the electronics board portion 20 to the heat sink portion 22. In yet another non-limiting example, a set of more than one mechanical fasteners can be utilized, wherein, for example, a first mechanical fastener enables or provides for physical attachment or coupling of the electronics board portion 20 to the heat sink portion 22, while a second mechanical fastener is utilized to mount the lighting element assembly 10 to a mounting surface. In the aforementioned example, the first and second mechanical fasteners can be different fasteners (e.g. a rivet and a screw). For case of understanding, the fastener has been generically illustrated as a set of screws 35.

The electronics board portion 20 can also include a set of electrical connectors, shown as conductive wires 30, for electrically coupling at least one of the circuit board 27, the supporting circuitry 28, or the LEDs 26 to a power source or a controller module configured to operate the like. While a set of conductive wires 30 are illustrated, non-limiting aspects of the disclosure can be included wherein as few as two conductive wires 30 are included (e.g. power and ground), or, for example, three conductive wires 30 are included (e.g. power, ground, common control signal configured or generated for controlling the set of LEDs 26). In yet another non-limiting aspect of the disclosure, the conductive wires 30 can connect by way of a physical locking connector that includes that conductive connection between the electronics board portion 20 and the power source or controller module. In another non-limiting example, aspects of the disclosure can include wireless connections, including but not limited to, wireless control, interface, or power connections or interfaces.

Non-limiting aspects of the heat sink portion 22 can include a thermally conductive material or partially thermally conductive material, such as a metal, metal alloy, non-metallic material, or the like, selected for thermally conductive or thermally dissipative properties. In another non-limiting aspect, the heat sink portion 22 can be rigid or flexible. During illumination operations, the LEDs 26 can generate an amount of heat that can be thermally conducted, for instance, via the circuit board 27, to the heat sink portion 22. Non-limiting configurations of the heat sink portion 22 can also include a first aperture or opening 32 sized, shaped, contoured, keyed, or the like, to receive or enable the set of conductive wires 30 to pass through the first opening 32. For example, while a circular opening 32 is shown, the opening 32 can include any shaping, sizing, or the like, including but not limited to a square opening. In another non-limiting configuration of the heat sink portion 22, a set of second openings 34 can be provided that are sized, shaped, contoured, keyed, or the like, to receive or enable the set or a subset of the screws 35 to pass through.

As shown, the optional adhesive pad 24 can include a corresponding set of second openings 34, aligned with the openings 34 of the heat sink portion 22 for receiving or enabling the set or a subset of the screws 35, as described. Non-limiting configurations of the optional adhesive pad 24 can also include a third aperture or opening 36 sized, shaped, contoured, keyed, or the like, to receive or enable the set of conductive wires 30 to pass through the third opening 36. Aspects of the disclosure are envisioned wherein the set of openings 34 are aligned or arranged based on the aforementioned mechanical fastener configurations or locations. In another non-limiting aspect of the disclosure, the optional adhesive pad 24 can be additive to or substituted by the addition of mechanical fasteners, adhesives, or the like, which couple to the heat sink portion 22.

Figure 3:
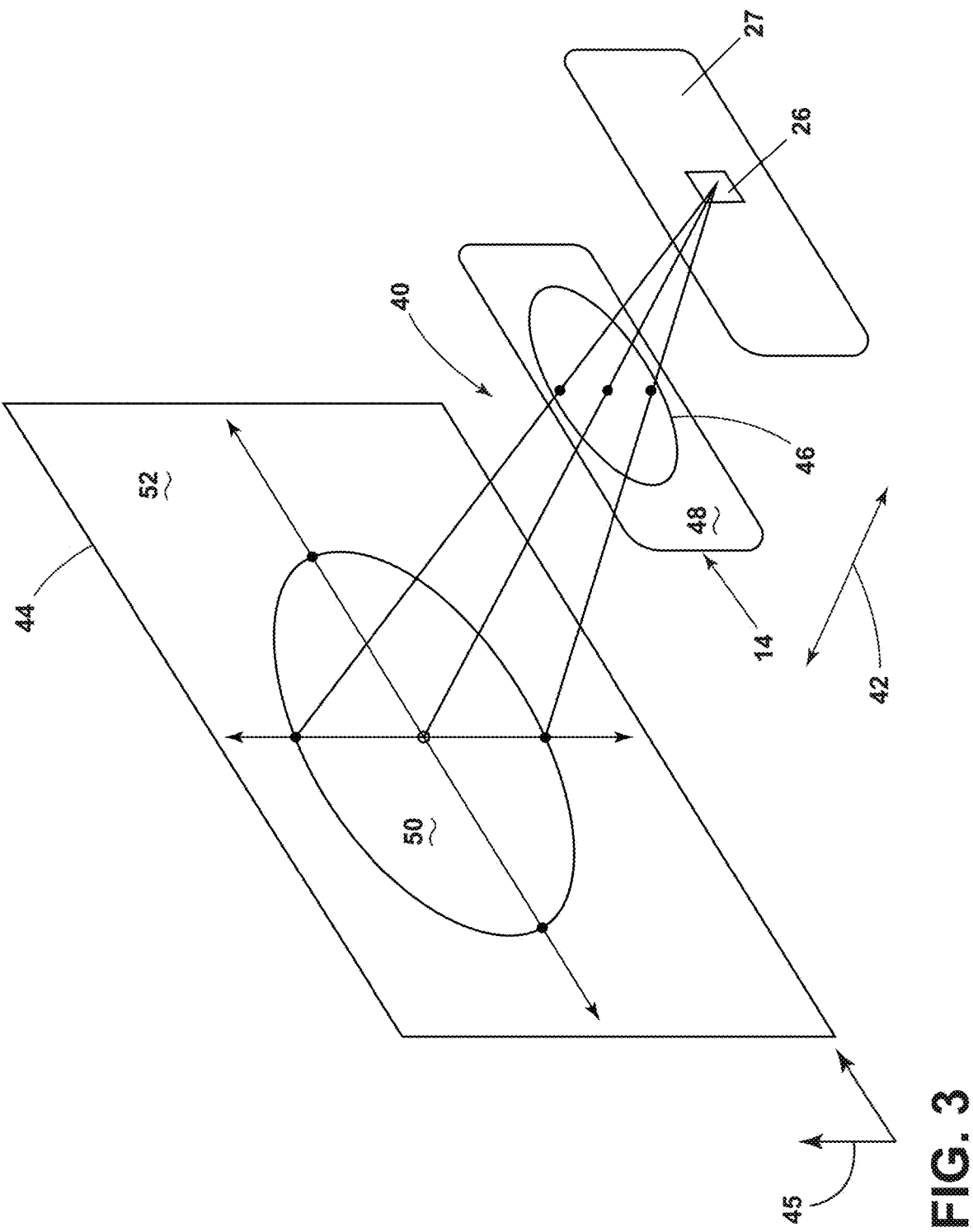
FIG. 3 illustrates a schematic illustration of a lighting or illumination pattern of aspects of the lighting element assembly, in accordance with various aspects described herein.

FIG. 3 illustrates one non-limiting schematic illustration of a lighting or illumination pattern for aspects of the disclosure. As shown, a single representative LED 26 on the circuit board 27 is shown illuminating an illumination or light pattern 40 in a first direction 42, where the light pattern 40 reaches a representative two-dimensional plane 44, demonstrating the light pattern 40 at a distance along the first direction 42 from the LED 26. Also, as shown, the light pattern 40 passes through at least a portion of the optical element 12 (not shown in FIG. 3), shown schematically as the first optical element 14. While the first optical element 14 is shown for brevity, any aspects of the optical element 12 can be included, however the first optical element 14 is described as the primary portion of the optical element 12 through which illumination from the light or LED 26, passes through. The first optical element 14 is further shown including at least a first portion of transmittance 46 defining a first transmittance and a second portion of transmittance 48 defining a second transmittance.

As used herein, "transmittance", "transmission" (with respect to light or illumination), and the like, refer to an ability or property of a matter, layer, form, or assembly, to transmit light or illumination through the matter. In another sense, the "transmittance" (or the like) refers to an absorption of light or illumination of the matter, layer, form, or assembly. For example, a highly transmissive matter has a low absorption of light energy.

For a simplified explanation, an example here contains a single piece optical element disposed between an illuminating element (such as an LED 26) and an illumination receiver, such as a sensor, a human observer's eye, or the like. The observer may view the light energy emitted by the LED 26, but the light is modified by the optical element 12, 14. The modification may be negligible or significant. The viewable light modification may be due to energy absorption of the optical element 12, 14, in addition to, or in the alternative, optical prescription light ray bending, refracting, the like, or a combination thereof. Non-limiting attributes of the optical element 12, 14 can operably affect the modification. For example, the optical element 12, 14 composition, or material's optical density, can include or define a measurement of this absorbance. The viewable light modification may also include, but is not limited to, light altering properties defined by the optical element 12, 14, including scattering or diffracting properties. In another non-limiting example, a viewable light modification may also include, but is not limited to, light altering properties defined by the optical element 12, 14, based on a glossy or matte surface or surface texture of the optical element 12, 14. In another non-limiting example, the viewable light modification is envisioned to be realized by optical density modification on the outermost surface of element 12, 14 or dispersed internally to element 12, 14, or the innermost surface of element 12, 14, or any combination of these locations.

The light passing through the optical element 12, 14 is attenuated by the amount of transmittance of the material. One exemplary definition for the relationship between Optical Density (OD) and Transmittance (T) is the following: Where higher Transmittance becomes lower Optical Density, and where higher Optical Density (OD) becomes lower Transmittance (T), and that the relationship is logarithmic:

$$A = -\log\left(\frac{\text{Intensity out}}{\text{Intensity in}}\right)$$

Absorbance (A) of light by the optical element 12, 14 can also be defined by the ratio of light entering and exiting the material:

$$OD = \log 10\left(\frac{1}{T}\right)$$

When using instrumentation to determine material properties, such as a Transmission Densitometer or Transmission Spectrophotometer, measurements are based on an aperture size of the optics evaluating the optical element under test. It is helpful to understand a limitation that some instrumentation may have a sampling aperture size that encompasses too big of a diameter to be practical for smaller optical elements.

Non-limiting aspects of the disclosure can be included wherein the first transmittance is different or not equal to the second transmittance. For example, the first transmittance or first portion of transmittance 46 can include or define a higher transmittance value or quality compared to the second transmittance or second portion of transmittance 48 (e.g. allowing for higher levels, quantities, or amounts of light or illumination to be transmitted through the first portion of transmittance 46 compared with the second portion of transmittance 48). In a similar sense, non-limiting aspects of the disclosure can be included wherein the first portion of transmittance 46 can define a lower absorbance value or quality than an absorbance value or quality of the second portion of transmittance 48. Non-limiting aspects of the disclosure can be included wherein at least one of the first portion of transmittance 46 or the second portion of transmittance 48 can be tailored, adapted, selected, or otherwise configured to control the respective transmittance value, absorbance value, or the like, as described herein. In another non-limiting example, the physical distance on the optical element 12, 14 of transition of transmittance from 46 to 48 may include an immediate or abrupt transition (shown) a short distance transition, a longer distance transition, or a variable distance transition.

As shown, at least a portion of the light pattern 40 passes through, or is transmitted through the first portion of transmittance 46, illustrated schematically as three light rays passing through, respectively a top perimeter boundary of the first portion of transmittance 46, a center portion of the first portion of transmittance 46, and a lower perimeter boundary of the first portion of transmittance 46. While no explicit light rays are shown passing through the second portion of transmittance 48, non-limiting aspects of the disclosure can be included wherein, for example, portions of the light pattern 40 can at least partially pass through, or be at least partially transmitted through the second portion of transmittance 48.

The projection, illumination, passing through, transmission, or the like, of the light pattern 40 of the LED 26 through the first optical element 14 results in, enables, or allows for the light pattern 40 reaching the representative two-dimensional plane 44 (with dimensions 45 being perpendicular to the first direction 42). As shown, the light pattern 40 can result in a first projection portion 50 defined by the light pattern 40 passing through the first portion of transmittance 46 and a second projection portion 52 defined by the light pattern 40 passing through the second portion of transmittance 48. As noted here, the second projection portion 52 defined by the light pattern 40 can further include a reduction in transmittance, a restriction of transmittance, an inhibiting of transmittance, a partial obstruction of transmittance by the second portion of transmittance 48, the like, or a combination thereof.

In one non-limiting example, the respective first and second portions of transmittance 46, 48 can be defined by respectively non-overlapping boundaries, by transitional boundaries that transition between the first transmittance of the first portion of transmittance 46 to the second transmittance of the second portion of transmittance 48, a blending or overlapping of respective first and second transmittances, the like, or a combination thereof. While "transitional" is described herein, additional like descriptions can be equally applicable, including, but not limited to, transitional, tapering, or the like, can be used interchangeably. Additionally, as used herein, "tapering" or "transitional" can further include uniform tapering or transitioning, non-uniform tapering or transitioning, or a combination of uniform and non-uniform tapering or transitioning, for example, about a boundary perimeter between the respective first and second portions of transmittance 46, 48.

While only a single LED 26 of the circuit board 27, and a corresponding single first portion of transmittance 46 is schematically shown for understanding, non-limiting aspects of the disclosure can be included wherein the optical element 12, 14, include multiple first portions of transmittance 46 aligned with, associated with, or otherwise adapted for respective transmittance for a corresponding set of one or more LEDs 26 on the circuit board 27. Additionally, or alternatively, non-limiting aspects of the disclosure can be included wherein a set or grouping of LEDs 26 can be aligned with, associated with, or otherwise adapted for respective transmittance for a corresponding single first portion of transmittance 46. Additionally while a generally ovate shape of the first portion of transmittance 46 is illustrated, non-limiting aspects of the disclosure can be included wherein at least one of the first or second portions of transmittance 46, 48, the optical element 12, 14, or the like, can be adapted or configured to be incorporated into any multitude of lighting element assembly 10, including, but not limited to, generally circular lighting element assemblies 10, generally ovate lighting element assemblies 10, cuboid lighting element assemblies, or the like.

Additionally, or alternatively, non-limiting aspects of the disclosure can be included wherein at least one of the first or second portions of transmittance 46, 48, the optical element 12, 14, or the like, can be adapted or configured to be incorporated to operably select a desired illumination or light pattern 40, first projection portion 50, second projection portion 52, or a combination thereof. For instance, in non-limiting examples, non-limiting aspects of the disclosure can be included wherein at least one of the first or second portions of transmittance 46, 48, the optical element 12, 14, or the like, can be adapted or configured to be incorporated to operably select a desired illumination or light pattern 40, first projection portion 50, or second projection portion 52, where the light pattern 40 or first projection portion 50 is compliant with state and federal lighting element regulation. Non-limiting examples of state or federal lighting element regulation can include, but is not limited to, the Society of Automotive Engineers (e.g. SAE International), United Nations Economic Commission for Europe (UNECE) for automotive industry, National Highway Transportation Safety Agency (NHTSA), United States Department of Transportation (US DOT), or similar bodies. In another non-limiting example of regulation, aspects of the disclosure can include the optical element 12, 14 having, for instance, a horizontal and vertical pattern of light distribution compliant with SAE J595.

Figure 4:
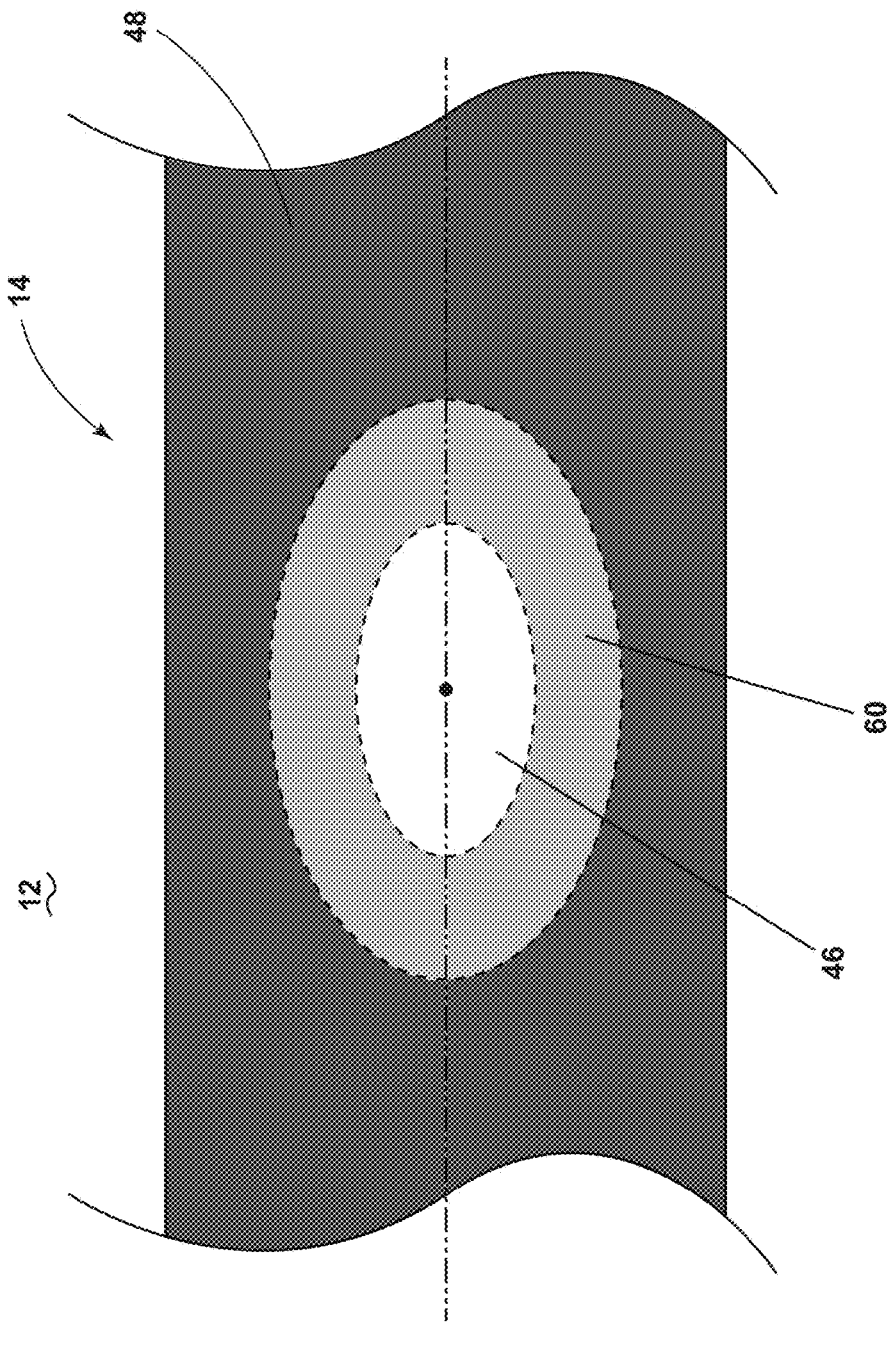
FIG. 4 illustrates a zoomed schematic view of an optical element of the lighting element assembly of FIG. 1, in accordance with various aspects described herein.

Turning now to FIG. 4, additional aspects of the optical element 12 can be further illustrated in a zoomed view of an exemplary portion of the first optical element 14. As shown, in addition to the first portion of transmittance 46 and the second portion of transmittance 48, non-limiting aspects of the disclosure can include a third portion of transmittance 60 positioned or located between the respective first and second portions of transmittance 46, 48. As understood, and compared with aspects of the disclosure described with respect to FIG. 3, non-limiting aspects of the disclosure can be included wherein the third portion of transmittance 60 can be a subpart, subportion, or subset of the second portion of transmittance 48. Alternatively, non-limiting aspects of the disclosure can be understood wherein the third portion of transmittance 60 is in addition to the respective first and second portions of transmittance 46, 48.

As will be understood, at least one of the first or second portions of transmittance 46, 48, the optical element 12, 14, or the like, is adapted or configured to be incorporated to operably select a desired illumination or light pattern 40, where the light pattern 40 or first projection portion 50 is compliant with state and federal lighting element regulation, it is understood that at least the first portion of transmittance 46 can define the features, qualities, factors, transmittance, absorbance, or the like, that defines the compliance. Stated another way, the "compliance" is defined primarily by the first portion of transmittance 46 of the optical element 12, 14, and not defined by either the second portion of transmittance 48, the third portion of transmittance, or the combination thereof.

Non-limiting aspects of the disclosure can be included wherein the third transmittance (define by the third portion of transmittance 60) is different or not equal to each of the first transmittance or the second transmittance. For example, the third transmittance or third portion of transmittance 60 can include or define a higher transmittance value or quality compared to the second transmittance or second portion of transmittance 48 (e.g. allowing for higher levels, quantities, or amounts of light or illumination to be transmitted through the third portion of transmittance 60 compared with the second portion of transmittance 48). In another non-limiting example, the third transmittance or third portion of transmittance 60 can include or define a lower transmittance value or quality compared to the first transmittance or first portion of transmittance 46 (e.g. allowing for lower levels, quantities, or amounts of light or illumination to be transmitted through the third portion of transmittance 60 compared with the first portion of transmittance 46). In a similar sense, non-limiting aspects of the disclosure can be included wherein the third portion of transmittance 60 can define a lower absorbance value or quality than an absorbance value or quality of the second portion of transmittance 48. Additionally, non-limiting aspects of the disclosure can be included wherein the third portion of transmittance 60 can define a higher absorbance value or quality than an absorbance value or quality of the first portion of transmittance 46. Non-limiting aspects of the disclosure can be included wherein the third portion of transmittance 60 can be tailored, adapted, selected, or otherwise configured to control the respective transmittance value, absorbance value, or the like, as described herein.

In another sense, the third portion of transmittance 60 can include or define a transition between the first transmittance of the first portion of transmittance 46 and the second transmittance of the second portion of transmittance 48. In yet another sense, the third portion of transmittance 60 can include or define a transitory transmittance that transitions between the between the first transmittance of the first portion of transmittance 46 and the second transmittance of the second portion of transmittance 48. For instance, a first transmittance of the first portion of transmittance 46 can define a consistent, stable, or otherwise non-changing transmittance (or absorbance) over the first portion of the optical element 12, 14, and a second transmittance of the second portion of transmittance 46 can define a consistent, stable, or otherwise non-changing transmittance (or absorbance) over the second portion of the optical element 12, 14. In contrast, non-limiting aspects of the disclosure can be included wherein the third portion of transmittance 60 can include of define a variable transmittance (or absorbance) over the third portion of the optical element 12, 14.

The variable transmittance (or absorbance) can include, but is not limited to, a consistent rate of change of transmittance or absorbance (e.g. a linear rate of change) as a given point or area moves outwardly on the optical element 12, 14 between the first portion of transmittance 46 and the second portion of transmittance 48. In another non-limiting example, the variable transmittance (or absorbance) can include, but is not limited to, a variable rate of change of transmittance or absorbance (e.g. a non-linear rate of change) as a given point or area moves outwardly on the optical element 12, 14 between the first portion of transmittance 46 and the second portion of transmittance 48. In yet another non-limiting example, the variable transmittance (or absorbance) can include, but is not limited to, a variable rate of change of transmittance or absorbance that varies between increasing, decreasing, or both increasing and decreasing transmittance (e.g. at different subportions of the third portion of transmittance 60) as a given point or area moves outwardly on the optical element 12, 14 between the first portion of transmittance 46 and the second portion of transmittance 48.

As explained herein, non-limiting aspects of the transmittance or absorbance of each of the first, second, and third portion of transmittance 46, 48, 60 can be operable enabled, allowed for, selected, manufactured, included, or the like, by way of operably selecting compositions, colors, additives, tintings, attenuation, dopings, pigment, dye, or physical properties or characteristics of the respective portions of the optical element 12, 14. In another non-limiting example, one or more additives included or incorporated with the first, second, or third portions of transmittance 46, 48, 60 (or a subset thereof) can include compositions, coloring elements, visible or non-visible spectrum light attenuation or attenuating elements, tinting elements, doping elements, pigment or dye elements, or illuminative enhancement elements, such as a phosphoric element. While aspects of the disclosure can be specifically referred with respect to "visible light" (e.g., "such as light in the visible wavelength spectrum"), additional or non-limiting aspects of the disclosure can also be applicable to non-visible light, that is, non-visible spectrum wavelength transmissions. The additive can be evenly dispersed or selectively positioned or located on or within the optical element 12, 14 or portions 46, 48, 60 thereof.

Figure 5:
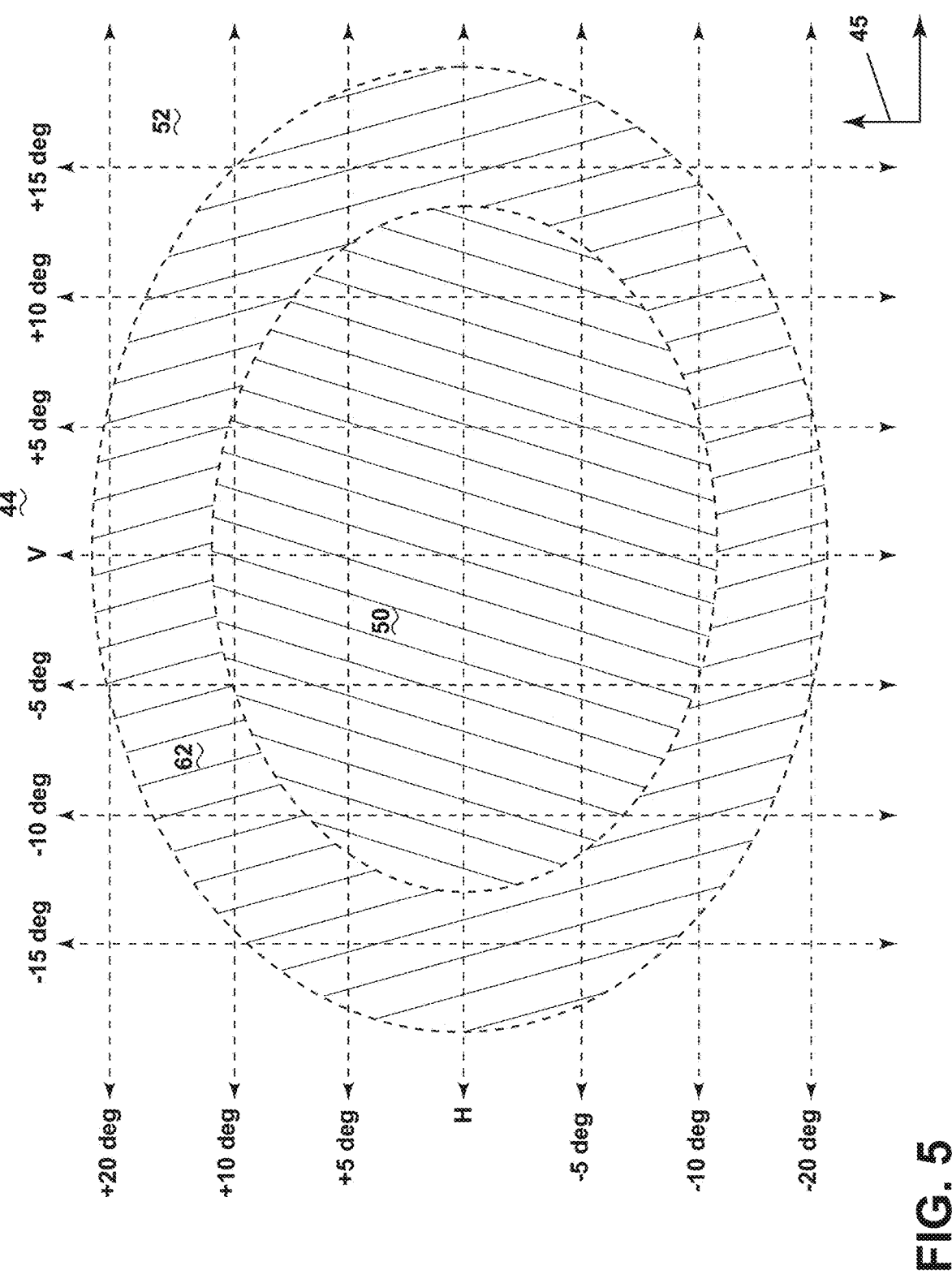
FIG. 5 illustrates a zoomed schematic view of the lighting or illumination pattern of the optical element of FIG. 4, in accordance with various aspects described herein.

FIG. 5 illustrates one non-limiting schematic example of a zoomed view of the two dimensional plane 44 of FIG. 3, including a resulting illumination or light pattern 40 based on the LED 26 illumination through the optical element 12, 14 of FIG. 4. As schematically illustrated, the first portion of transmittance 46 (not shown) can allow for a low absorbance or a high transmittance of illumination, resulting in the centralized first projection portion 50. As used herein, "centralized" refers to a central point or region about the respective dimensions 45, including relative angle offset measurements of each axis (with "H" representing the horizontal axis and "V" representing the vertical axis). The first projection portion 50 can be encircled by or bound by a third projection portion 62 resulting in an illumination or light pattern 40 of the LED 26 illumination through the third portion of transmittance 60 (not shown). Non-limiting aspects of the disclosure can be included wherein the third portion can define, allow for, or otherwise enable a medium absorbance or a medium transmittance of illumination, resulting in the third projection portion 62.

Also shown, in FIG. 5, the second portion of transmittance 48 (not shown) can allow for a high absorbance or a low transmittance of illumination, resulting in the second projection portion 52. The second projection portion 52 can encircle or bound the third projection portion 62 resulting in an illumination or light pattern 40 of the LED 26 illumination through the second portion of transmittance 48 (not shown). In non-limiting examples, the third projection portion 62 can result in an illumination or light pattern 40 of the LED 26 illumination through the second portion of transmittance 48, the third portion of transmittance 60, or a combination thereof. As the second projection portion 52 bounds the two-dimensional plane 44 of FIG. 5, no specific shading or cross-hatching is illustrated, as all plane 44 space outside of the third projection portion 62 is included in the second projection portion 52.

While examples of "high," "medium," and "low" transmittance are used herein, relative values and ranges of transmittance can be used to define the respective terms. For instance, in one non-limiting example, a "high" transmittance of illumination (or correspondingly a "highly" transmissive component) can include a portion of the optical element 12, 14 that allows for or enables greater than 80% of light transmission through the optical element 12, 14, such as light in the visible wavelength spectrum (approximately 400-700 nm). In another non-limiting example, a "high" transmittance of illumination can include a portion of the optical element 12, 14 that allows for or enables greater than 85% of light transmission through the optical element 12, 14, such as light in the visible wavelength spectrum. In yet another non-limiting example, a "high" transmittance of illumination can include a portion of the optical element 12, 14 that allows for or enables greater than 91% of light transmission through the optical element 12, 14, such as light in the visible wavelength spectrum. In yet another non-limiting example, a "high" transmittance of illumination can include a portion of the optical element 12, 14 that allows for or enables greater than 94% of light transmission through the optical element 12, 14, such as light in the visible wavelength spectrum.

In another non-limiting example, a "medium" transmittance of illumination (or correspondingly a "medium" transmissive component) can include a portion of the optical element 12, 14 that allows for or enables between 20% and 80% of light transmission through the optical element 12, 14, such as light in the visible wavelength spectrum (approximately 400-700 nm). In another non-limiting example, a "medium" transmittance of illumination (or correspondingly a "medium" transmissive component) can include a portion of the optical element 12, 14 that allows for or enables above 10% of light transmission, above 20% of light transmission, below 90% of light transmission, below 80% of light transmission, or a combination thereof, through the optical element 12, 14, such as light in the visible wavelength spectrum. In yet another non-limiting example, a "medium" transmittance of illumination can include a portion of the optical element 12, 14 that allows for or enables between 90% and 94% of light transmission through the optical element 12, 14, such as light in the visible wavelength spectrum. In yet another non-limiting example, a "medium" transmittance of illumination can include a portion of the optical element 12, 14 that allows for or enables as low as 50% of light transmission through the optical element 12, 14, such as light in the visible wavelength spectrum. In yet another non-limiting example, a "medium" transmittance of illumination can include a portion of the optical element 12, 14 that allows for or enables less than 40% of light transmission through the optical element 12, 14, such as light in the visible wavelength spectrum. In another non-limiting example, and in accordance with the earlier explanation, a "medium" transmittance of illumination can transition between a first transmittance to a second transmittance, such as, and including, a "high" transmittance, as defined herein, transitioning to a "low" transmittance, also as described herein.

In another non-limiting example, a "low" transmittance of illumination (or correspondingly a "low" transmissive component) can include a portion of the optical element 12, 14 that allows for or enables less than 20% of light transmission through the optical element 12, 14, such as light in the visible wavelength spectrum (approximately 400-700 nm). In another non-limiting example, a "low" transmittance of illumination (or correspondingly a "low" transmissive component) can include a portion of the optical element 12, 14 that allows for or enables as low as 0% of light transmission through the optical element 12, 14, such as light in the visible wavelength spectrum, effectively blocking transmission of visible light.

Further, while examples of "high," "medium," and "low" absorbance are used herein, relative values and ranges of transmittance can be used to define the respective terms. For instance, in one non-limiting example, a "high" absorbance of illumination can include a portion of the optical element 12, 14 that absorbs, blocks, inhibits, attenuates, reduces, or otherwise prevents transmission of 80% of light transmission through the optical element 12, 14, such as light in the visible wavelength spectrum (approximately 400-700 nm). In another non-limiting example, a "high" absorbance of illumination can include a portion of the optical element 12, 14 that absorbs, blocks, inhibits, attenuates, reduces, or otherwise prevents transmission of 85% of light transmission through the optical element 12, 14, such as light in the visible wavelength spectrum. In yet another non-limiting example, a "high" absorbance of illumination can include a portion of the optical element 12, 14 that that absorbs, blocks, inhibits, attenuates, reduces, or otherwise prevents transmission of as much as 100% of light transmission through the optical element 12, 14, such as light in the visible wavelength spectrum, effectively blocking transmission of visible light. By definition, absorbance would approach infinity at this point due to the logarithmic relationship.

In another non-limiting example, a "medium" absorbance of illumination can include a portion of the optical element 12, 14 that absorbs, blocks, inhibits, attenuates, reduces, or otherwise prevents transmission of between 20% and 80% of light transmission through the optical element 12, 14, such as light in the visible wavelength spectrum (approximately 400-700 nm). In another non-limiting example, a "medium" absorbance of illumination can include a portion of the optical element 12, 14 that absorbs, blocks, inhibits, attenuates, reduces, or otherwise prevents transmission of above 10% of light transmission, of above 20% of light transmission, of below 90% of light transmission, of below 80% of light transmission, or a combination thereof, through the optical element 12, 14, such as light in the visible wavelength spectrum. In yet another non-limiting example, a "medium" absorbance of illumination can include a portion of the optical element 12, 14 that absorbs, blocks, inhibits, attenuates, reduces, or otherwise prevents transmission of above between 6% and 10% of light transmission through the optical element 12, 14, such as light in the visible wavelength spectrum. In yet another non-limiting example, a "medium" absorbance of illumination can include a portion of the optical element 12, 14 that absorbs, blocks, inhibits, attenuates, reduces, or otherwise prevents transmission of above 50% of light transmission through the optical element 12, 14, such as light in the visible wavelength spectrum. In another non-limiting example, and in accordance with the earlier explanation, a "medium" absorbance of illumination can transition between a first transmittance or absorbance to a second transmittance or absorbance, such as, and including, a "high" transmittance (or "low" absorbance), as defined herein, transitioning to a "low" transmittance (or "high" absorbance), also as described herein.

In another non-limiting example, a "low" absorbance of illumination can include a portion of the optical element 12, 14 that absorbs, blocks, inhibits, attenuates, reduces, or otherwise prevents transmission of less than 20% of light transmission through the optical element 12, 14, such as light in the visible wavelength spectrum (approximately 400-700 nm). In another non-limiting example, a "low" absorbance of illumination can include a portion of the optical element 12, 14 that absorbs, blocks, inhibits, attenuates, reduces, or otherwise prevents transmission of as low as 0% of light transmission through the optical element 12, 14, such as light in the visible wavelength spectrum, effectively allowing or enabling all transmission of visible light. In yet another non-limiting another non-limiting example, a "low" absorbance of illumination can include a portion of the optical element 12, 14 that absorbs, blocks, inhibits, attenuates, reduces, or otherwise prevents transmission of less than 9% of light transmission through the optical element 12, 14, such as light in the visible wavelength spectrum. In yet another non-limiting example, a low" absorbance of illumination can include a portion of the optical element 12, 14 that absorbs, blocks, inhibits, attenuates, reduces, or otherwise prevents transmission of less than 6% of light transmission through the optical element 12, 14, such as light in the visible wavelength spectrum.

Figure 6:
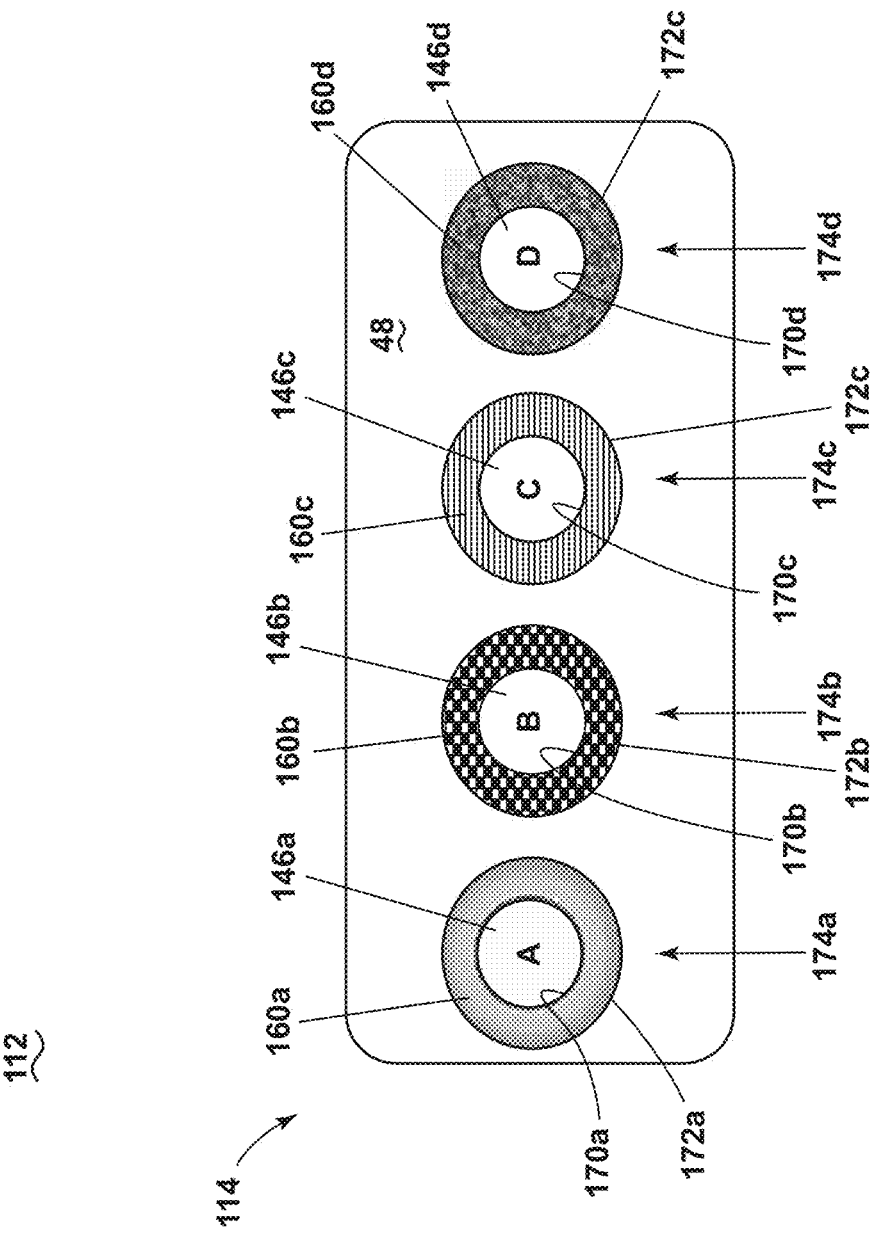
FIG. 6 illustrates additional aspects of a third portion of transmittance of the optical element of FIG. 4, in accordance with various aspects described herein.

FIG. 6 illustrates another optical element 112 according to another aspect of the present disclosure. The optical element 112 is similar to the optical element 12; therefore, like parts will be identified with like numerals increased by 100, with it being understood that the description of the like parts of the optical element 12 applies to the optical element 112, unless otherwise noted. One difference is that optical element 112 illustrates several additional examples of aspects of the disclosure.

For instance, a first example 174a (denoted "A") is shown included in a first optical element 114, and includes a first portion of transmittance 146a and a third portion of transmittance 160a. The first portion of transmittance 146a can be bound by a first perimeter 170a and the third portion of transmittance 160a can be bound by a second perimeter 172a. The second portion of transmittance 48 is shown across the optical element 112, 114, outside of the third portion of transmittance 160a. As shown, the third portion of transmittance 160a can define a variable transmittance or absorbance in a direction away from the first portion of transmittance 146a (or first perimeter 170a) toward the second portion of transmittance 48 (or toward the second perimeter 172a). In this example, the transmittance of the third portion of transmittance 160a is higher closer toward the first perimeter 170a, and transitions to a lower transmittance in a direction moving toward the second perimeter 172a. In another sense, the absorbance of the third portion of transmittance 160a is lower closer toward the first perimeter 170a, and transitions to a higher absorbance in a direction moving toward the second perimeter 172a.

In another non-limiting instance, a second example 174b (denoted "B") is shown included in the first optical element 114, and includes a first portion of transmittance 146b and a third portion of transmittance 160b. The first portion of transmittance 146b can be bound by a first perimeter 170b and the third portion of transmittance 160b can be bound by a second perimeter 172b. The second portion of transmittance 48 is shown across the optical element 112, 114, outside of the third portion of transmittance 160b. As shown, the third portion of transmittance 160b can define patterning of higher transmittance portions (e.g. higher transmittance proportion or value) and lower transmittance portions (e.g. lower transmittance proportion or value, compared to the higher transmittance portion), or of higher absorbance portions and lower absorbance portions. In one non-limiting example, the third portion of transmittance 160b can define a "checkerboard" pattern of transparent the higher transmittance portions and lower transmittance portions. In this example, the transmittance of the third portion of transmittance 160b can average or define a higher transmittance, compared with the first portion of transmittance 146b, and a lower transmittance compared with the second portion of transmittance 48.

In yet another non-limiting instance, a third example 174c (denoted "C") is shown included in the first optical element 114, and includes a first portion of transmittance 146c and a third portion of transmittance 160c. The first portion of transmittance 146c can be bound by a first perimeter 170c and the third portion of transmittance 160c can be bound by a second perimeter 172c. The second portion of transmittance 48 is shown across the optical element 112, 114, outside of the third portion of transmittance 160c. As shown, the third portion of transmittance 160c can define patterning of higher transmittance portions and lower transmittance portions, or of higher absorbance portions and lower absorbance portions. In one non-limiting example, the third portion of transmittance 160c can define a set of parallel lines extending through the third portion of transmittance 160c. In this example, the transmittance of the third portion of transmittance 160c can average or define a higher transmittance, compared with the first portion of transmittance 146c, and a lower transmittance compared with the second portion of transmittance 48. In another non-limiting aspect of the third example 174c, the set of parallel lines extending through the third portion of transmittance 160c can further include or define a diffractive or polarizing effect, as desired. In non-limiting instances, the diffractive or polarizing effect can be modified or included based on line size, spacing, pitch, the like, or a combination thereof, to produce a desired effect. Additional patterns of lines (parallel or not) can be included in aspects of the disclosure.

In yet another non-limiting instance, a fourth example 174d (denoted "D") is shown included in the first optical element 114, and includes a first portion of transmittance 146d and a third portion of transmittance 160d. The first portion of transmittance 146d can be bound by a first perimeter 170d and the third portion of transmittance 160d can be bound by a second perimeter 172d. The second portion of transmittance 48 is shown across the optical element 112, 114, outside of the third portion of transmittance 160d. As shown, the third portion of transmittance 160d can define patterning of higher transmittance portions and lower transmittance portions, or of higher absorbance portions and lower absorbance portions. In one non-limiting example, the third portion of transmittance 160d can define a "camouflage" pattern of the higher transmittance portions and lower transmittance portions. In this example, the transmittance of the third portion of transmittance 160d can average or define a higher transmittance, compared with the first portion of transmittance 146d, and a lower transmittance compared with the second portion of transmittance 48.

Figure 7:
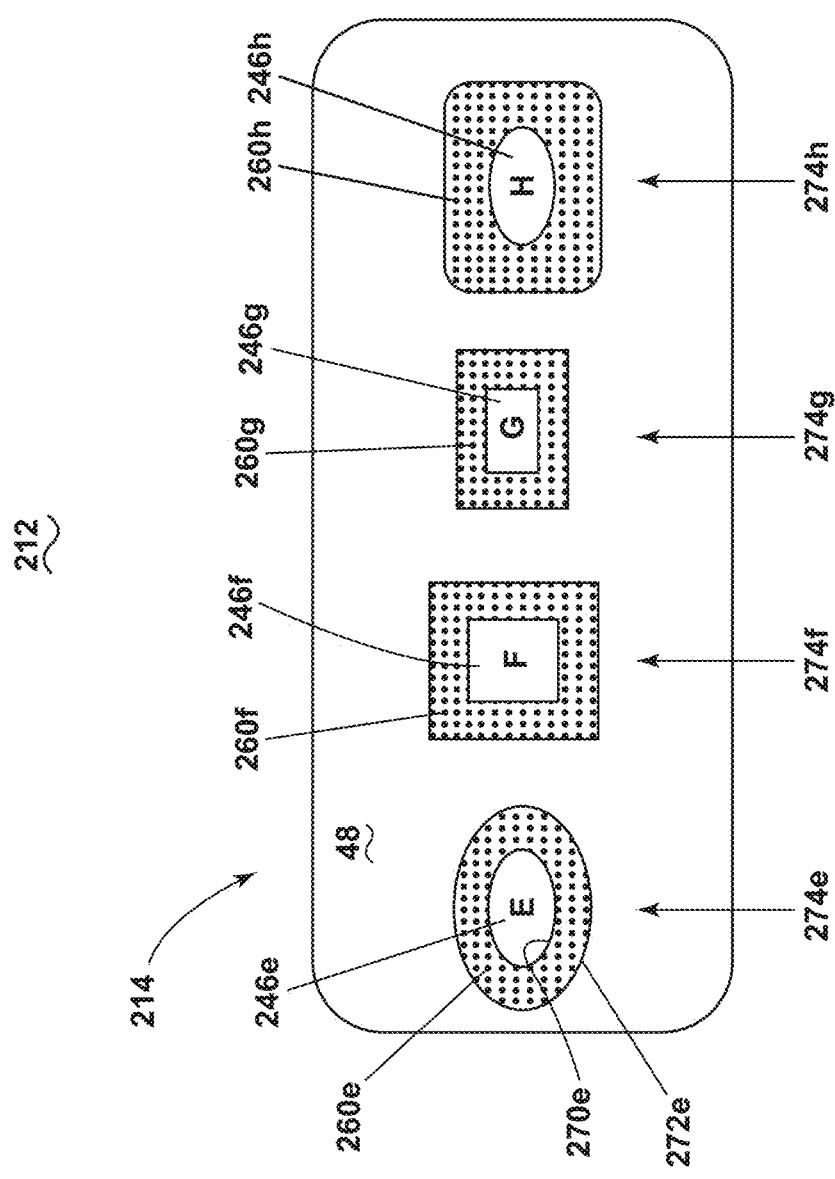
FIG. 7 illustrates yet additional aspects of a third portion of transmittance of the optical element of FIG. 4, in accordance with various aspects described herein.

While FIG. 6 illustrates several non-limiting examples of the third portion of transmittance 160*a-d*, FIG. 7 illustrates several non-limiting examples of relative shapes of the first and third portions of transmittance. As shown, another optical element 212 according to another aspect of the present disclosure, is similar to the optical elements 12, 112; therefore, like parts will be identified with like numerals increased to 200, with it being understood that the description of the like parts of the optical elements 12, 112 applies to the optical element 212, unless otherwise noted.

For instance, a fifth example 274*e* (denoted "E") is shown included in a first optical element 214, and includes a generally ovate first portion of transmittance 246*e* and a generally ovate third portion of transmittance 260*e*. The first portion of transmittance 246*c* can be bound by a first perimeter 270*e* and the third portion of transmittance 260*e* can be bound by a second perimeter 272*e*. The second portion of transmittance 48 is shown across the optical element 212, 214, outside of the third portion of transmittance 260*c*. Additionally, as shown, the third portion of transmittance 260*e* can define patterning of higher transmittance portions and lower transmittance portions, or of higher absorbance portions and lower absorbance portions. In one non-limiting example, the third portion of transmittance 260*e* can define a "dotted" pattern of the higher transmittance portions and lower transmittance portions. In this example, the transmittance of the third portion of transmittance 160*d* can average or define a higher transmittance, compared with the first portion of transmittance 146*d*, and a lower transmittance compared with the second portion of transmittance 48. While "dots" are illustrated, additional geometric pattern components can be included or incorporated, including, but not limited, squares, triangles, cuboid, diamonds, lines, or the like, or a combination thereof.

In another non-limiting instance, a sixth example 274*f* (denoted "F") is shown included in a first optical element 214, and includes a generally square or cuboid first portion of transmittance 246*f* and a generally square or cuboid third portion of transmittance 260*f*. The first portion of transmittance 246*f* can be bound by a first perimeter 270*f* and the third portion of transmittance 260*f* can be bound by a second perimeter 272*f*. The second portion of transmittance 48 is shown across the optical element 212, 214, outside of the third portion of transmittance 260*f*.

In another non-limiting instance, a seventh example 274*g* (denoted "G") is shown included in a first optical element 214, and includes a generally rectangular or cuboid first portion of transmittance 246*g* and a generally rectangular or cuboid third portion of transmittance 260*g*. The first portion of transmittance 246*g* can be bound by a first perimeter 270*g* and the third portion of transmittance 260*g* can be bound by a second perimeter 272*g*. The second portion of transmittance 48 is shown across the optical element 212, 214, outside of the third portion of transmittance 260*g*.

In another non-limiting instance, an eighth example 274*h* (denoted "H") is shown included in a first optical element 214, and includes a generally ovate first portion of transmittance 246*h* and a generally rounded rectangular or cuboid with rounded corners third portion of transmittance 260*h*. The first portion of transmittance 246*h* can be bound by a first perimeter 270*h* and the third portion of transmittance 260*h* can be bound by a second perimeter 272*h*. The second portion of transmittance 48 is shown across the optical element 212, 214, outside of the third portion of transmittance 260*h*.

While individual examples are illustrated, and combination of examples can be included in aspects of the disclosure.

For example, in one non-limiting example, one of the first portion of transmittance 46, 146, 246, the third portion of transmittance 60, 160, 260, or a combination thereof, can be shaped to match or correspond with the overall lighting element assembly 10 design or shape.

In conventional lighting assemblies or optical elements, a "tinted" lens provides or allows for a tint appearance, much like window tint appearance, in a generally uniform Optical Density modifier that is throughout the optical element or lens. In this example, where a cross-sectional thickness of the lens increases or decreases (for instance, in the direction of the light transmission path), the resulting Optical Density also varies. In other words, if one identical light module is created with a tinted lens and one with a clear lens, there is a significant visual appearance difference and a significant light output resulting. Any increase of light output for the tinted lens to comply with regulations becomes additional energy usage (e.g. and wasted energy in some instances), including thermal heating due to the loss of transmissivity of the lens material. Additionally, particular tints or Optical Density modifiers can result in inconstant light output across the visible color spectrum (e.g. blue light wavelengths are reduced significantly more than red light wavelengths). Thus, non-limiting aspects of the disclosure can be included wherein the lighting assembly described herein can result in energy savings compared with conventional lighting assemblies, due to the benefits of the first, second, and third portions of transmittance, as described herein. In one example, aspects of the disclosure can be included to maximize overall optical lens 14 transmissivity relating to predefined optical path(s) while minimizing transmissivity in all other regions of lens 14, in order to avoid attenuation of light source signal 26 specific lighting optical path requirements.

Non-limiting aspects of the disclosure can be included wherein consistent light energy attenuation is allowed for or enabled by way of the first portion of transmittance 46, 146, 246, while meeting desired design characteristics, including, but not limited to, meeting state or federal lighting output regulations, and also providing for or allowing for human visual effects different than a full clear lens approach, by way of the lower transmittance second and third portions of transmittance 48, 60, 148, 160, 248, 260, in a single form factor optical element 12, 14, 112, 114, 212, 214. The technical effect of aspects of the disclosure allow for the benefits of each respective optical design without the detriments of inconsistent or non-uniform transmission of light output in the high transmittance portion of the optical element 12, 14, 112, 114, 212, 214.

Thus, non-limiting aspects of the disclosure can be included defining or utilizing less light output or signal loss due to light attenuation while the light is on (e.g. in the first and third portions of transmittance), yet offering a customer desired visual effect of the light module appearance while the light is off (e.g. an overall visual appearance closer to the visual appearance of the second portion of transmittance. The visual effect may be partially opaque, by way of material property of a visual effect material or by non-continuous application of the at least partially opaque visual effect material (e.g. a transitional effect, or the partial transmittance of the third portion of transmittance). Non-limiting aspects of the visual effect of the second or third portions of transmittance can include a spectrally neutral visual effect (e.g. gray, black, smoke, etc.) or may be comprised of one or more chromatic colors (for example, to match a mounting surface, such as a wall or car color).

The visual effect of aspects of the disclosure will allow for or enable change or modification of the visual appearance of the lighting module or optical element while either no light or at least very small amounts of light are being output from the lighting module, relative to a lighting module with no visual effect material. The design and selection of visual effect materials can be optimized for background blending of the lighting module, reduction of conspicuity of the lighting module components internal and external, to increase of conspicuity of the light module, or other decorative or informative details. Reduced visibility, or increased concealment can result in more effective vehicle utilization, such as for law enforcement. Reduced visibility or increased concealment is further enabled by a lower overall height of the lighting element assembly, as described.

Many other possible embodiments and configurations in addition to that shown in the above figures are contemplated by the present disclosure.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An optical element comprising:
a first portion of transmittance defining high transmittance enabling greater than 80% of light transmission; and
a second portion of transmittance defining a low transmittance enabling less than 40% of light transmission, wherein the second portion of transmittance encircles the first portion of transmittance;
wherein the optical element further comprises an external surface that defines a set of light altering properties at least partially defining the first portion of transmittance and at least partially defining the second portion of transmittance, and wherein the second portion of transmittance includes a spectrally neutral visual effect, enabling a concealing of the optical element.

2. The optical element of claim 1, wherein the first and second portions of transmittance are portions on at least one of a planar surface or a non-planar surface.

3. The optical element of claim 1, further comprising a third portion of transmittance, wherein the third portion of transmittance encircles the first portion of transmittance, and wherein the second portion of transmittance encircles the third portion of transmittance.

4. The optical element of claim 3, wherein the third portion of transmittance defines a transmittance between the high transmittance and the low transmittance.

5. The optical element of claim 4 wherein the third portion of transmittance defines a transitional transmittance that varies over the third portion of transmittance.

6. The optical element of claim 1, wherein the external surface further defines a glossy surface texture.

7. The optical element of claim 1, wherein the optical element is an optical element mounted on a vehicle, and wherein the external surface further defines a surface texture matching a surface texture of the vehicle.

8. A lighting element assembly comprising:
at least two illuminators spaced from each other; and
an optical element associated with the at least two illuminators, and defining a respective first portion of transmittance defining high transmittance of light transmission from each associated illuminator of the at least two illuminators, and further defining a respective second portion of transmittance defining a low transmittance of light transmission from the each associated illuminator of the at least two illuminators, wherein the first portion of transmittance enables greater light transmission from the illuminator than the second portion of transmittance, and wherein each respective second portion of transmittance at least partially encircles each respective first portion of transmittance;
wherein the second portion of transmittance defines a patterning of absorbance portions relative to non-absorbance portions.

9. The lighting element assembly of claim 8, wherein illumination of each of the at least two illuminators projects a light pattern in a first direction through the optical element, the light pattern defining a first projection portion defined by the light pattern passing through the first portion of transmittance and a second projection portion defined by the light pattern passing through the second portion of transmittance.

10. The lighting element assembly of claim 9, wherein each first projection portion defines a pattern of light distribution compliant with SAE J595.

11. The lighting element assembly of claim 8, wherein the optical element further defines a third portion of transmittance, wherein the third portion of transmittance at least partially encircles a respective first portion of transmittance, and wherein the respective second portion of transmittance at least partially encircles the third portion of transmittance.

12. The lighting element assembly of claim 11, wherein the third portion of transmittance defines a transmittance between the high transmittance and the low transmittance.

13. The lighting element assembly of claim 8, wherein the optical element further comprises an external surface that defines a set of light altering properties defining each of the respective first portions of transmittance and the second portions of transmittance, and wherein the light altering properties defining each of the respective second portions of transmittance includes an energy absorbance value.

14. The lighting element assembly of claim 13, wherein the energy absorbance value is based on a composition applied to the external surface of the optical element.

15. The lighting element assembly of claim 8, wherein the patterning of absorbance portions further defines an arrangement of at least one of dots, squares, triangles, cuboids, diamonds, lines, or a combination thereof.

16. The lighting element assembly of claim 8, wherein the patterning defined by the respective second portion of transmittance includes a transitional transmittance that varies over the respective second portion of transmittance.

17. The lighting element assembly of claim 16, wherein the transitional transmittance that varies over the respective second portion of transmittance modifies the patterning of absorbance portions in at least one of a size dimension of the absorbance portions or a spacing dimension between absorbance portions such that the varying of the transitional transmittance reduces the average transmittance of the second portion of transmittance in a direction away from the first portion of transmittance.

18. The lighting element assembly of claim 8, wherein the optical element further defines a first respective second portion of transmittance associated with a first illuminator of the at least two illuminators, the first respective second portion defining a first patterning of absorbance portions relative to non-absorbance portions, and wherein the optical element further defines a second respective second portion of transmittance associated with a second illuminator of the at least two illuminators, the second respective second portion defining a second patterning of absorbance portions relative to non-absorbance portions, and wherein the first patterning is a different pattern from the second patterning.

\* \* \* \* \*